(12) United States Patent
Angus et al.

(10) Patent No.: US 8,589,020 B1
(45) Date of Patent: Nov. 19, 2013

(54) UPDATING IDENTITY INFORMATION IN AIRCRAFT NETWORK DATA PROCESSING SYSTEMS

(75) Inventors: Ian Gareth Angus, Mercer Island, WA (US); Steven Craig Venema, Kirkland, WA (US)

(73) Assignee: The Boeing Company, Chicago, IL (US)

( * ) Notice: Subject to any disclaimer, the term of this patent is extended or adjusted under 35 U.S.C. 154(b) by 29 days.

(21) Appl. No.: 13/306,528

(22) Filed: Nov. 29, 2011

(51) Int. Cl.
*G01M 17/00* (2006.01)
*G06F 7/00* (2006.01)
*G06F 11/30* (2006.01)
*G21C 17/00* (2006.01)

(52) U.S. Cl.
USPC .......... 701/29.6; 701/29.1; 702/183; 702/184

(58) Field of Classification Search
USPC .......................... 701/29.6, 29.1; 702/183, 184
See application file for complete search history.

(56) References Cited

U.S. PATENT DOCUMENTS

| | | | |
|---|---|---|---|
| 6,671,589 B2 | 12/2003 | Holst et al. | |
| 6,868,319 B2 * | 3/2005 | Kipersztok et al. | 702/185 |
| 7,840,812 B1 * | 11/2010 | Levenberg | 713/176 |
| 2003/0187878 A1 * | 10/2003 | Sandifer | 707/104.1 |
| 2006/0020782 A1 * | 1/2006 | Kakii | 713/156 |
| 2006/0106836 A1 * | 5/2006 | Masugi et al. | 707/101 |
| 2006/0229772 A1 | 10/2006 | McClary | |
| 2009/0138872 A1 * | 5/2009 | Fuchs et al. | 717/173 |
| 2009/0138874 A1 * | 5/2009 | Beck et al. | 717/173 |
| 2009/0150022 A1 * | 6/2009 | McMillin et al. | 701/35 |
| 2009/0187976 A1 * | 7/2009 | Perroud et al. | 726/4 |
| 2009/0198393 A1 | 8/2009 | Sims, III et al. | |
| 2010/0199129 A1 * | 8/2010 | Kitani | 714/25 |
| 2010/0299742 A1 * | 11/2010 | Declety et al. | 726/13 |

OTHER PUBLICATIONS

"TCG Trusted Network Connect TNC Architecture for Interoperability", Trusted Computing Group Incorporated, Specification V. 1.4, Rev. 4, May 2009, 45 pages.
"HAP Technology Overview: Trusted Computing Technologies Used in the High Assurance Platform", National Security Agency/Central Security Service, Jan. 2011, 1 page.
U.S. Appl. No. 13/271,871, filed Oct. 12, 2011, Angus et al.
U.S. Appl. No. 13/246,610, filed Sep. 27, 2011, Angus et al.
Non-final office action dated Apr. 16, 2013 regarding U.S. Appl. No. 13/246,610, 15 pages.

* cited by examiner

*Primary Examiner* — Thomas Black
*Assistant Examiner* — Tyler Paige
(74) *Attorney, Agent, or Firm* — Yee & Associates, P.C.

(57) ABSTRACT

A method and apparatus for updating identity information in an aircraft network data processing system on an aircraft. A data processing device is connected to the aircraft network data processing system. Updated identity information and a digital signature for the updated identity information are received by the aircraft network data processing system from the data processing device. The aircraft network data processing system determines whether the digital signature is correct and whether the updated identity information is newer than current identity information stored in persistent storage in the aircraft network data processing system. Responsive to determinations that the digital signature is correct and that the updated identity information is newer than the current identity information, the updated identity information is stored in the persistent storage in the aircraft network data processing system.

20 Claims, 4 Drawing Sheets

UPDATING IDENTITY INFORMATION IN AIRCRAFT NETWORK DATA PROCESSING SYSTEMS

BACKGROUND INFORMATION

1. Field

The present disclosure relates generally to identity information, such as identity information that is referred to in certificate revocation lists, that is used by data processing systems to control access to such systems. Still more particularly, the present disclosure relates to updating identity information used by network data processing systems on aircraft and other systems that may have limited access to the sources of such identity information.

2. Background

Modern aircraft are extremely complex. For example, an aircraft may have many types of electronic systems on-board. These systems are often in the form of line-replaceable units (LRUs). A line-replaceable unit is an item that can be removed and replaced from an aircraft. A line-replaceable unit is designed to be easily replaceable.

A line-replaceable unit may take on various forms. A line-replaceable unit on an aircraft may be, for example, without limitation, a flight management system, an autopilot, an in-flight entertainment system, a communications system, a navigation system, a flight controller, a flight recorder, a collision avoidance system, a system to support maintenance functions, or a system to support crew processes. The various line-replaceable units on an aircraft may be parts of an aircraft network data processing system.

Line-replaceable units may use software or programming to provide the logic or control for various operations and functions. Typically, software on an aircraft is treated as one or more separate parts or is combined with a hardware part and is unchangeable without changing the hardware part number. Aircraft software that is treated as an aircraft part may be referred to as a loadable aircraft software part or a aircraft software part. Aircraft software parts are parts of an aircraft's configuration.

Aircraft operators are entities that operate aircraft. Aircraft operators also may be responsible for the maintenance and repair of aircraft. Examples of aircraft operators include airlines and military units. When an aircraft operator receives an aircraft, aircraft software parts may be already installed in the line-replaceable units on the aircraft.

An aircraft operator may also receive copies of loaded aircraft software parts in case the parts need to be reinstalled or reloaded into the line-replaceable units on the aircraft. Reloading of aircraft software parts may be required, for example, if a line-replaceable unit in which the software is used is replaced or repaired. Further, the aircraft operator also may receive updates to the aircraft software parts from time to time. These updates may include additional features not present in the currently-installed aircraft software parts and may be considered upgrades to one or more line-replaceable units. Specified procedures may be followed during loading of a aircraft software part on an aircraft such that the current configuration of the aircraft, including all of the aircraft software parts loaded on the aircraft, is known.

An aircraft operator or other aircraft maintenance entity may perform maintenance operations on an aircraft. Some maintenance operations may be performed by connecting a maintenance device to the aircraft network data processing system. For example, the maintenance device may be a portable computing device, such as a laptop computer. The maintenance device may include software stored on the device that is used to perform various maintenance operations on the aircraft. The maintenance device also may include other software stored on the device.

It is desired that only maintenance devices from approved maintenance entities, including only approved software from trusted software suppliers, be allowed to access the aircraft network data processing system. An unapproved maintenance device may have unapproved software on the maintenance device. Unapproved software may include software that is corrupted, software that is infected with a virus, or other unapproved software. Unapproved software may affect the operation of the aircraft network data processing system in undesired ways if an unapproved maintenance device containing such software is allowed to access the aircraft network data processing system.

Ground-based data processing networks may employ digital certificates in a public key infrastructure to ensure that only approved devices are allowed to access the network. Such digital certificates also may be known as public key certificates or identity certificates. The digital certificates are issued by a certificate authority that is trusted by the network. A data processing device attempting to access the network may present a digital certificate for the device to the network. The digital certificate identifies the data processing device, or the user of that device, to the network in a manner that can be trusted. The network may use the digital certificate to determine whether or not the data processing device will be allowed to access the network.

Current systems and methods for network access control to entirely ground-based computer networks may not be applied effectively to mobile systems, such as aircraft. The particular environment in which network data processing systems on aircraft are operated and maintained makes it difficult or impossible to use such current network access control systems and methods for determining whether a maintenance device or other data processing device should be allowed to access an aircraft network data processing system. This is due partly to the fact that aircraft are often disconnected from back office networks and partly to the conventions for aircraft configuration control that are followed in aircraft maintenance operations.

Accordingly, it would be desirable to have a method and apparatus that takes into account one or more of the issues discussed above as well as possibly other issues.

SUMMARY

An embodiment of the present disclosure provides a method for updating identity information in an aircraft network data processing system on an aircraft. The aircraft network data processing system receives updated identity information and a digital signature for the updated identity information from a data processing device connected to the aircraft network data processing system. The aircraft network data processing system determines whether the digital signature is correct and whether the updated identity information is newer than current identity information stored in persistent storage in the aircraft network data processing system. Responsive to determinations that the digital signature is correct and that the updated identity information is newer than the current identity information, the updated identity information is stored in persistent storage in the aircraft network data processing system.

Another embodiment of the present disclosure provides an apparatus comprising a processor unit on an aircraft network data processing system on an aircraft. The processor unit is configured to receive updated identity information and a digital signature for the updated identity information from a data processing device connected to the aircraft network data processing system. The processor unit is further configured to determine whether the digital signature is correct and whether the updated identity information is newer than current identity information stored in persistent storage in the aircraft network data processing system. The processor unit is further configured to store the updated identity information in the persistent storage in response to determinations that the digital signature is correct and that the updated identity information is newer than the current identity information.

Another embodiment of the present disclosure provides another method for updating identity information in an aircraft network data processing system on an aircraft. A data processing device is connected to the aircraft network data processing system. Updated identity information, a digital signature for the updated identity information, and a time stamp for the updated identity information are sent from the data processing device to the aircraft network data processing system. The updated identity information comprises information identifying a plurality of items. Identity information for the data processing device is sent from the data processing device to the aircraft network data processing system. The data processing device accesses the aircraft network data processing system in response to a determination that the data processing device is allowed to access the aircraft network data processing system. The determination is made using the updated identity information and the identity information for the data processing device.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives, and features thereof will best be understood by reference to the following detailed description of illustrative embodiments of the present disclosure when read in conjunction with the accompanying drawings, wherein:

DETAILED DESCRIPTION

Figure 1:
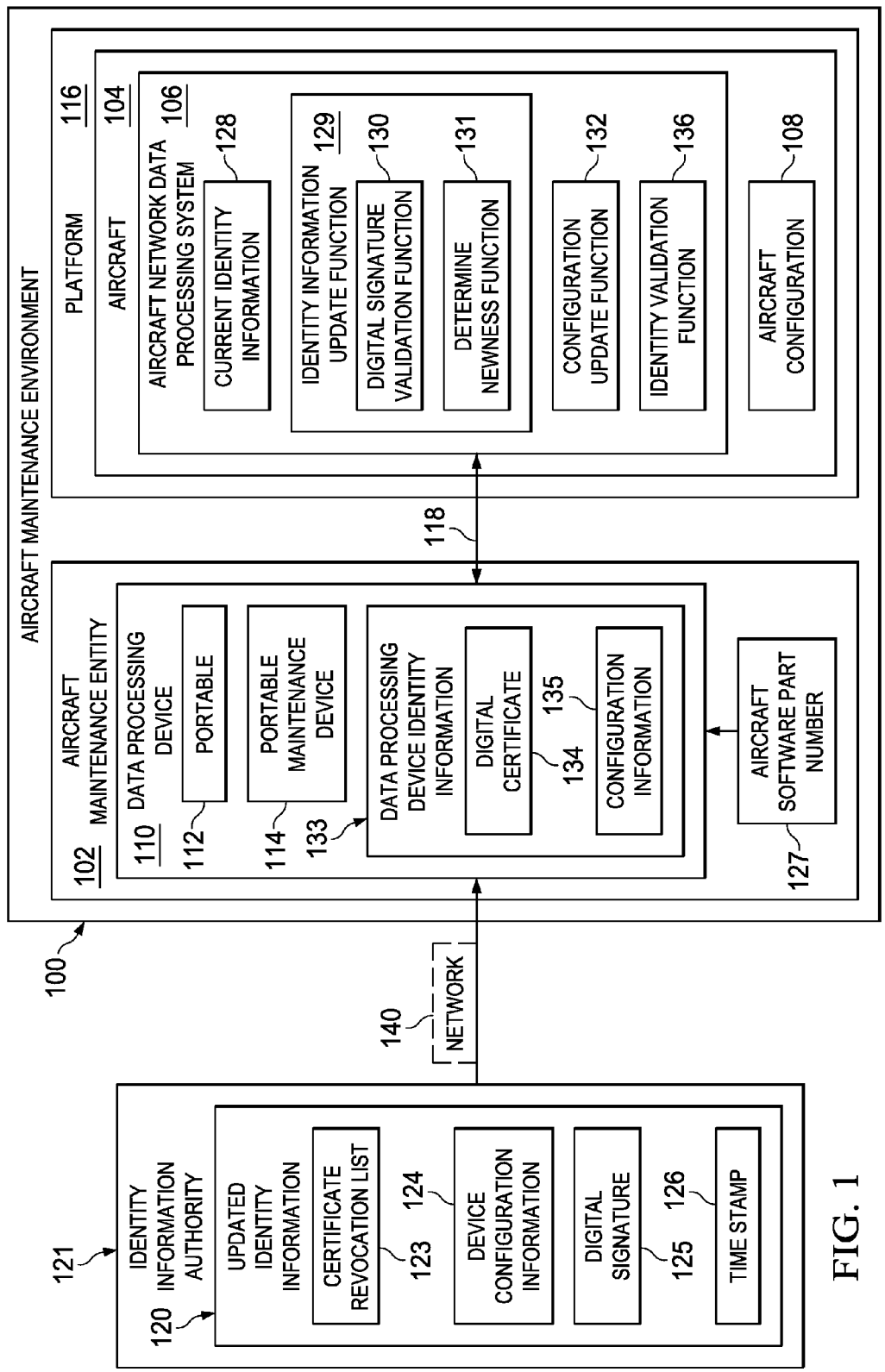
FIG. 1 is an illustration of a block diagram of an aircraft maintenance environment for maintaining an aircraft in accordance with an illustrative embodiment.

The different illustrative embodiments recognize and take into account a number of different considerations. "A number", as used herein with reference to items, means one or more items. For example, "a number of different considerations" means one or more different considerations.

The different illustrative embodiments recognize and take into account that systems using digital certificates for network access control may rely on the use of certificate revocation lists. A certificate revocation list is a list of certificates or, more specifically, a list of serial numbers for certificates that have been revoked. For example, without limitation, a digital certificate may be revoked if it is discovered that the certificate authority had improperly issued a certificate, if a private key associated with the certificate is thought to have been compromised, or for failure of an identified entity to adhere to policy requirements specified by or for the certificate authority. Network access should be denied to any device presenting a revoked digital certificate.

A system may obtain the latest version of a certificate revocation list via a network or other connection to the certificate authority. For example, without limitation, a system may obtain the latest certificate revocation list via an internet or other network connection to the certificate authority. The system may obtain the latest version of the certificate revocation list by requesting an updated certificate revocation list from the certificate authority periodically, in response to an attempt to access the network in which a digital certificate is presented, or both.

In any case, the different illustrative embodiments recognize and take into account that it is desirable to reduce the period of time between when a certificate revocation list is received by a system and the time that the certificate revocation list is used by the system to determine whether or not a device is allowed to access the system. As this period of time increases, the likelihood increases that the current certificate revocation list that is retained and used by the system does not list one or more digital certificates that were revoked after the last updated certificate revocation list was received. Thus, if an updated certificate revocation list is received less frequently by the system, the likelihood increases that the system may allow access to the system where such access may have been denied if the latest certificate revocation list was available to the system.

The different illustrative embodiments recognize and take into account that the environment in which the network data processing system on an aircraft is operated and maintained may make it difficult for a data processing system on the aircraft to obtain and store the latest certificate revocation list. For example, network data processing systems on mobile platforms, such as aircraft, often may be disconnected from access to other computer networks. Therefore, a network data processing system on an aircraft may have limited access to a certificate authority and thus may not be able to obtain the latest certificate revocation list from a certificate authority as frequently as desired.

The different illustrative embodiments also recognize and take into account that a certificate revocation list is one example of identity information that may be used by a system to determine whether access to the system by a data processing device will be granted or denied. Another example of such identity information is device configuration information.

The configuration of a data processing device may be represented by one or more numbers that are derived by applying an appropriate function to all or a portion of the software on the device. For example, without limitation, the configuration of a data processing device may be identified by applying one or more hash functions, other functions, or combinations of functions to all or a portion of the software on the device.

A data processing device may present such configuration information to a system which the device desires to access. The system may use the presented configuration information to determine whether or not access to the system will be granted. For example, without limitation, access to the system may be granted if the configuration information presented by the device matches an approved configuration in device configuration information that is available to the system. As another example, access to the system may be denied if the configuration information presented by the device matches a known, disapproved, or revoked configuration in device configuration information that is available to the system. Further disclosure on the use of device configuration information for network access control is found in U.S. patent application Ser. No. 13/246,610, filed on Sep. 27, 2011, entitled "Verification of Devices Connected to Aircraft Data Processing Systems", and assigned to the assignee of the present application, the disclosure of which is incorporated herein by reference.

In any case, the different illustrative embodiments recognize and take into account that it is desirable that the latest device configuration information is available to a system for use in determining whether access to the system by a data processing device is allowed or denied. Using the latest device configuration information for access control ensures that a more accurate determination may be made of whether or not access to the system by a data processing device having a particular configuration will be allowed.

One or more of the illustrative embodiments provides a system and method for providing an updated certificate revocation list to an aircraft network data processing when a maintenance device is connected to the aircraft network data processing system. The maintenance device may have more frequent access to a certificate authority than the aircraft network data processing system. Therefore, the maintenance device may have stored thereon an updated certificate revocation list that is newer than the current certificate revocation list stored on the aircraft network data processing system.

The updated certificate revocation list includes a digital signature provided by the certificate authority. The aircraft network data processing system may determine whether the digital signature for the updated certificate revocation list is correct. If the digital certificate is determined to be correct, the aircraft network data processing system may determine whether the updated certificate revocation list is newer than the current certificate revocation list retained by the aircraft network data processing system. If the updated certificate revocation list is newer, the updated certificate revocation list may be saved in persistent storage on the aircraft network data processing system. The presence of the new data on the aircraft may be reported by updating the aircraft configuration reported by the aircraft. The updated certificate revocation list then may be used to determine whether the data processing device is allowed to access the aircraft network data processing system.

Illustrative embodiments may be used to provide updated identity information other than certificate revocation lists to an aircraft network data processing system. For example, without limitation, illustrative embodiments may be used to provide updated device configuration information or other identity information to an aircraft network data processing system.

Turning now to FIG. 1, an illustration of a block diagram of an aircraft maintenance environment for maintaining an aircraft is depicted in accordance with an illustrative embodiment. In this example, aircraft maintenance environment 100 may include aircraft maintenance entity 102 and aircraft 104.

Aircraft maintenance entity 102 in aircraft maintenance environment 100 may be any entity that is responsible for maintaining aircraft 104. For example, aircraft maintenance entity 102 may include an aircraft manufacturer, an aircraft operator, both, or any combination of these or other entities. Aircraft maintenance entity 102 may or may not be the owner of aircraft 104. Aircraft maintenance entity 102 may include an entity acting on behalf of the owner of aircraft 104 to maintain aircraft 104. In any case, it is assumed that aircraft maintenance entity 102 has authority to access aircraft 104.

Aircraft 104 may be a commercial or private passenger aircraft, cargo aircraft, or a military or other government aircraft. Aircraft 104 may include aircraft network data processing system 106. Aircraft software may be loaded onto aircraft 104 in the form of aircraft software parts. Aircraft network data processing system 106 and any aircraft software parts together define aircraft configuration 108. Aircraft software parts may be loaded onto aircraft 104 by aircraft maintenance entity 102. Aircraft maintenance entity 102 may follow specified procedures for loading of aircraft software parts on aircraft 104 so that aircraft configuration 108, including all aircraft software parts currently installed on aircraft 104, is known.

Aircraft maintenance entity 102 may maintain aircraft 104 using data processing device 110. It is assumed that aircraft maintenance entity 102 has authority to access aircraft network data processing system 106 using data processing device 110 to perform maintenance operations on aircraft 104.

Data processing device 110 may be portable 112. For example, without limitation, data processing device may be portable maintenance device 114. Data processing device 110 may be connected to aircraft network data processing system 106 on aircraft 104 to perform various maintenance operations on aircraft 104. For example, without limitation, data processing device 110 may be a laptop computer, other portable computer, or other type of portable data processing device that may be connected to aircraft network data processing system 106.

Aircraft 104 is one example of platform 116 in which an illustrative embodiment may be implemented. Platform 116 may be another type of vehicle or other mobile structure. For example, without limitation, platform 116 may be an aerospace vehicle that is capable of traveling through the air, in space, or both. As another example, without limitation, platform 116 may be a vehicle that is capable of traveling on land, on the surface of water, or underwater. In another illustrative embodiment, platform 116 may be a static system. For example, without limitation, platform 116 may be an industrial control system or other generally non-mobile system. In general, illustrative embodiments may be used for updating identity information in any system that is often not connected, or not reliably connected, to other networks.

Data processing device 110 is configured to be connected to aircraft network data processing system 106 on aircraft 104 via interface 118. Interface 118 may be implemented in any manner appropriate for providing an exchange of data or information between data processing device 110 and aircraft network data processing system 106 using any transmission medium and any protocol. Interface 118 may provide a physical connection, such as an electric wire or fiber optic connection. Alternatively, interface 118 may provide a wireless connection. Interface 118 may include hardware, software, or a combination of hardware and software operating together to provide the connection between data processing device 110 and aircraft network data processing system 106. Interface 118 may be implemented, at least in part, as part of data processing device 110. For example, without limitation, interface 118 may provide an Ethernet or similar type of connection between data processing device 110 and aircraft network data processing system 106 on aircraft 104.

In accordance with an illustrative embodiment, aircraft network data processing system 106 may use identity information to determine whether or not data processing device 110 and other devices and systems are allowed to access aircraft network data processing system 106. Identity information authority 121 may periodically make available updated identity information 120. Updated identity information 120 may be certificate revocation list 123, device configuration information 124, or other identity information. In the case where updated identity information 120 is certificate revocation list 123, identity information authority 121 may be a certificate authority.

In the case where updated identity information 120 is device configuration information 124, device configuration information 124 may include device configuration information for a plurality of device configurations. For example, without limitation, device configuration information 124 may include information identifying a plurality of revoked device configurations.

In any case, updated identity information 120 may include information for identifying a plurality of items. For example, where updated identity information 120 is certificate revocation list 123, the plurality of items may be a plurality of revoked digital certificates. Where updated identity information 120 is device configuration information 124, the plurality items may be a plurality of revoked device configurations.

Identity information authority 121 may associate digital signature 125 and time stamp 126 with updated identity information 120. Digital signature 125 is used to confirm that updated identity information 120 is from an approved source. Time stamp 126 may indicate a time that updated identity information 120 is created or released.

Updated identity information 120 may be loaded on data processing device 110 in any conventional manner. For example, updated identity information 120 may be loaded on data processing device 110 by connecting data processing device 110 to identity information authority 121 via network 140. For example, network 140 may be the internet.

In accordance with an illustrative embodiment, aircraft software part number 127 may be associated with updated identity information 120 in data processing device 110. For example, without limitation, aircraft software part number 127 may be associated with updated identity information 120 by aircraft maintenance entity 102 or by another entity with the appropriate authority.

Data processing device 110 may send updated identity information 120, including digital signature 125 and time stamp 126, and aircraft software part number 127 to aircraft network data processing system 106 via interface 118 when data processing device 110 connects to aircraft network data processing system 106. Aircraft network data processing system 106 may have current identity information 128 stored thereon. Aircraft network data processing system 106 may be configured to perform identity information update function 129, configuration update function 132, and identity validation function 136.

Identity information update function 129 may include digital signature validation function 130 and determine newness function 131. Digital signature validation function 130 checks digital signature 125 of updated identity information 120 to determine whether digital signature 125 is correct.

Determine newness function 131 determines whether updated identity information 120 is newer than current identity information 128. For example, without limitation, determine newness function 131 may use time stamp 126 of updated identity information 120 to determine whether updated identity information 120 is newer than current identity information 128. As another example, determine newness function 131 may use a sequential serial number for updated identity information 120 to determine whether updated identity information 120 is newer than current identity information 128.

If it is determined that digital signature 125 is correct and that updated identity information 120 is newer than current identity information 128, then identity information update function 129 may replace current identity information 128 with updated identity information 120. For example, in this case, updated identity information 120 may be stored in persistent storage on aircraft network data processing system 106. If updated identity information 120 is loaded in aircraft network data processing system 106, then configuration update function 132 may use aircraft software part number 127 to change aircraft configuration 108.

Data processing device 110 may request access to aircraft network data processing system 106 by sending data processing device identity information 133 to aircraft network data processing system 106. For example, without limitation, data processing device identity information 133 may be digital certificate 134, configuration information 135, other identity information, or combinations of identity information. Configuration information 135 may identify a configuration of software on data processing device 110. Identity validation function 136 may use data processing device identity information 133 and updated identity information 120 loaded on aircraft network data processing system 106 to determine whether data processing device 110 is allowed to access aircraft network data processing system 106. Thus, in accordance with an illustrative embodiment, data processing device 110 may provide updated identity information 120 to aircraft network data processing system 106 that is then used by aircraft network data processing system 106 to determine whether further access to aircraft network data processing system 106 by data processing device 110 will be allowed.

The illustration of FIG. 1 is not meant to imply physical or architectural limitations to the manner in which different illustrative embodiments may be implemented. Other components in addition to, in place of, or both in addition to and in place of the ones illustrated may be used. Some components may be unnecessary in some illustrative embodiments. Also, the blocks are presented to illustrate some functional components. One or more of these blocks may be combined or divided into different blocks when implemented in different illustrative embodiments.

For example, a system and method for updating identity information in an aircraft network data processing system on an aircraft, as described herein, also may be used for updating identity information in data processing systems on other vehicles or other platforms that are often disconnected from access to a certificate authority. Illustrative embodiments also may be used to update other data that is protected by digital certificates and that can be referenced by a unique tag, such as a serial number.

Figure 2:
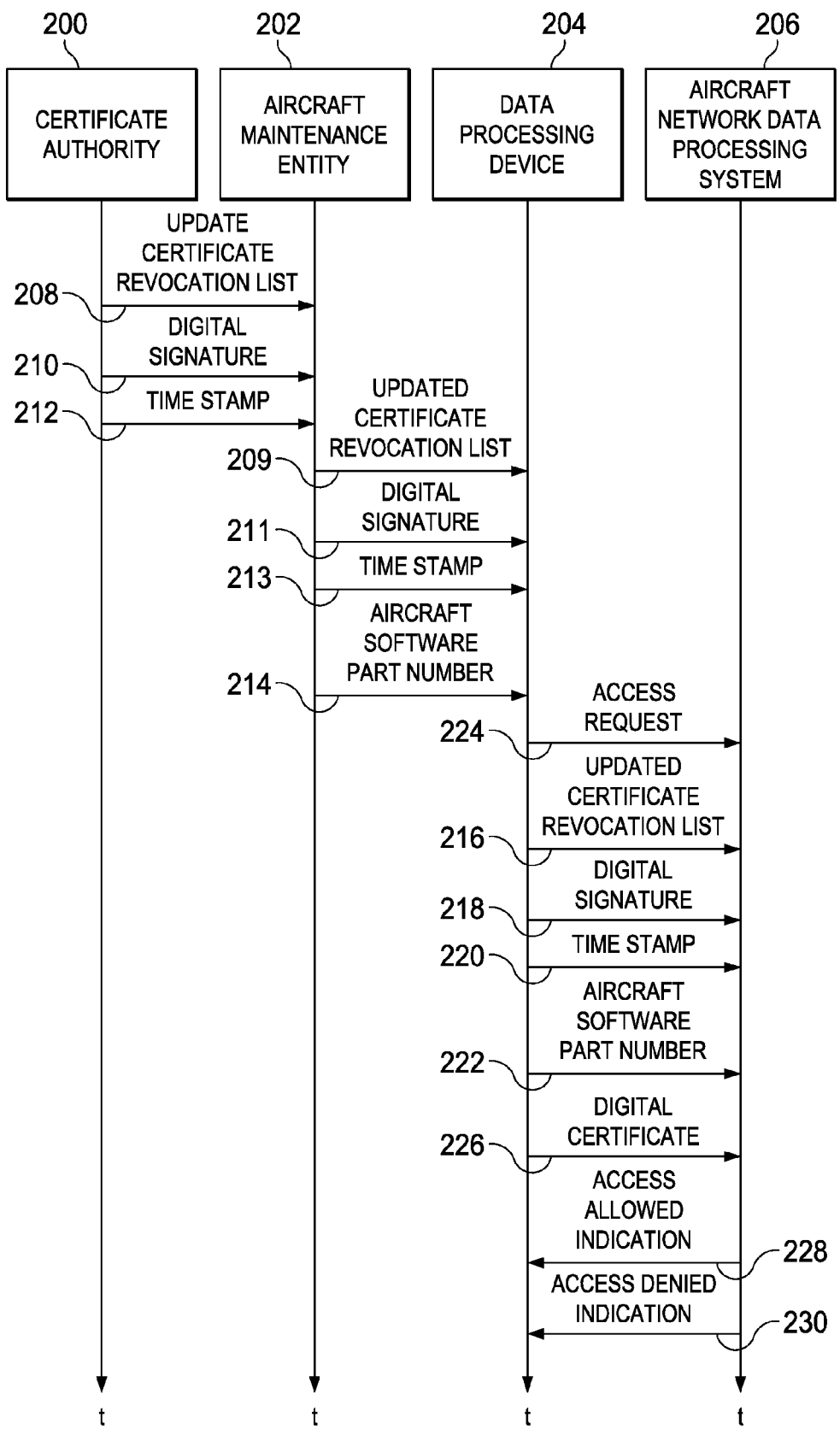
FIG. 2 is an illustration of information transfer for updating identity information in an aircraft network data processing system on an aircraft in accordance with an illustrative embodiment.

Turning now to FIG. 2, an illustration of information transfer for updating identity information in an aircraft network data processing system on an aircraft is depicted in accordance with an illustrative embodiment. Information transfers for updating identity information in the form of an updated certificate revocation list are depicted in FIG. 2. Similar information transfers may be used for updating other types of identity information, such as device configuration information.

Information transfers between certificate authority 200 and aircraft maintenance entity 202, between aircraft maintenance entity 202 and data processing device 204, and between data processing device 204 and aircraft network data processing system 206 are illustrated in FIG. 2. In this example, certificate authority 200 is an example of identity information authority 121 in FIG. 1. Aircraft maintenance entity 202 is an example of aircraft maintenance entity 102 in FIG. 1. Data processing device 204 is an example of data processing device 110 in FIG. 1. Aircraft network data processing system 206 is an example of aircraft network data processing system 106 in FIG. 1.

Initially, updated certificate revocation list 208, digital signature 210 for updated certificate revocation list 208, and time stamp 212 are transferred to aircraft maintenance entity 202 from certificate authority 200. Digital signature 210 and time stamp 212 may be included, along with the list of revoked certificates, as parts of updated certificate revocation list 208. In this example, time stamp 212 is covered by digital signature 210. For other types of identity information, such as updated configuration information, a digital signature and time stamp may be incorporated with the updated identity information as one or more packages provided by the identity information authority.

Aircraft maintenance entity 202 may provide aircraft software part number 214 for updated certificate revocation list 208. Aircraft maintenance entity 202 may load updated certificate revocation list 209, digital signature 211 for updated certificate revocation list 209, time stamp 213, and aircraft software part number 214 onto data processing device 204. Data processing device 204 then may be connected to aircraft network data processing system 206.

Updated certificate revocation list 216, digital signature 218, time stamp 220, and aircraft software part number 222 then may be sent from data processing device 204 to aircraft network data processing system 206. This exchange of information may be part of access request 224 by data processing device 204 to access aircraft network data processing system 206. Digital signature 218 and time stamp 220 are used by aircraft network data processing system 206 to determine whether updated certificate revocation list 216 will be used to replace the current certificate revocation list in aircraft network data processing system 206. If the current certificate revocation list is replaced by updated certificate revocation list 216, aircraft software part number 222 may be used to update the aircraft configuration.

Data processing device 204 also may send digital certificate 226 for data processing device 204 to aircraft network data processing system 206. Aircraft network data processing system 206 then may use updated certificate revocation list 216 and digital certificate 226 to determine whether data processing device 204 is allowed to access aircraft network data processing system 206. If access is allowed, aircraft network data processing system 206 may send access allowed indication 228 to data processing device 204. If access is not allowed, aircraft network data processing system 206 may send access denied indication 230 to data processing device 204.

Figure 3:
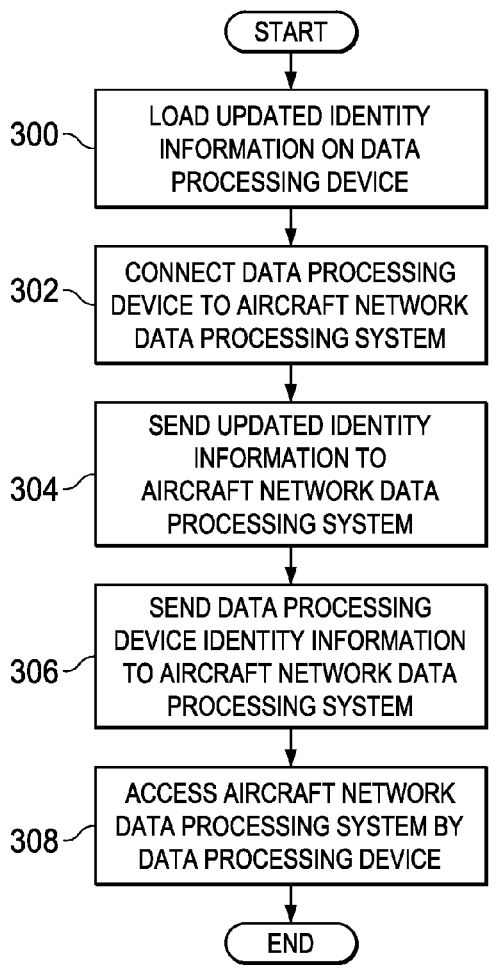
FIG. 3 is an illustration of a flowchart of a process for updating identity information in an aircraft network data processing system using a data processing device for accessing the aircraft network data processing system in accordance with an illustrative embodiment.

Turning now to FIG. 3, an illustration of a flowchart of a process for updating identity information in an aircraft network data processing system using a data processing device for accessing the aircraft network data processing system is depicted in accordance with an illustrative embodiment. For example, the process of FIG. 3 may be implemented in data processing device 110 in FIG. 1.

The process begins by loading updated identity information on the date processing device (operation 300). The data processing device then may be connected to an aircraft network data processing system on an aircraft (operation 302). Updated identity information is then sent from the data processing device to the aircraft network data processing system (operation 304). Identity information for the data processing device then may be sent from the data processing device to the aircraft network data processing system (operation 306). The data processing device may access the aircraft network data processing system in response to a determination using the updated identity information and the identity information for the data processing device that the data processing device is allowed to access the aircraft network data processing system (operation 308), with the process terminating thereafter.

Figure 4:
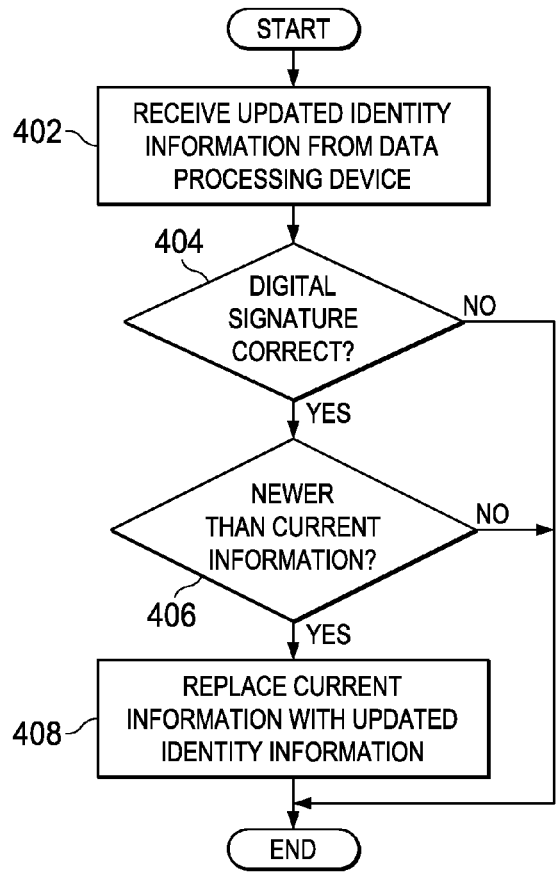
FIG. 4 is an illustration of a flowchart of a process for updating identity information in an aircraft network data processing system in accordance with an illustrative embodiment.

Turning now to FIG. 4, an illustration of a flowchart of a process for updating identity information in an aircraft network data processing system is depicted in accordance with an illustrative embodiment. For example, the process of FIG. 4 may be implemented in aircraft network data processing system 106 in FIG. 1.

The process begins with the aircraft network data processing system receiving updated identity information from a data processing device connected to the aircraft network data processing system (operation 402). It then may be determined whether a digital signature for the update identity information is correct (operation 404). A determination at operation 404 that the digital signature is not correct may mean that the updated identity information is not valid identity information from an authorized source, and the process terminates thereafter. If it is determined that the digital signature is correct, it then may be determined whether the updated identity information is newer than current identity information in the aircraft network data processing system (operation 406). If it is determined that the updated identity information is not newer than the current identity information in the aircraft network data processing system, the process terminates. Otherwise, the current identity information is replaced with the updated identity information (operation 408), with the process terminating thereafter.

Figure 5:
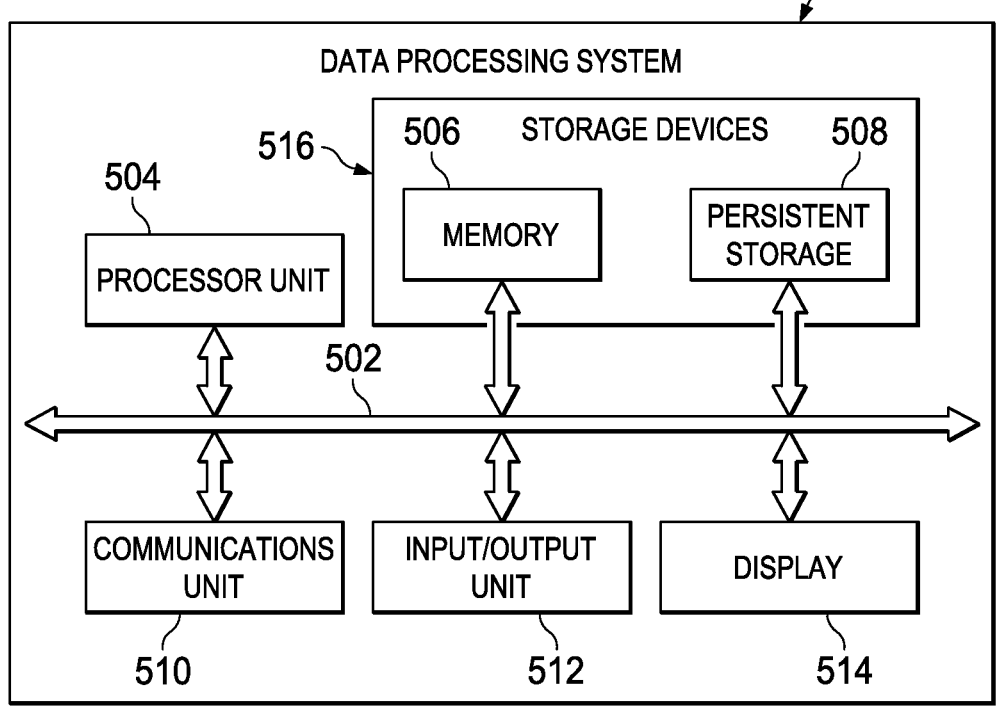
FIG. 5 is an illustration of a data processing system in accordance with an illustrative embodiment.
Figure 5:
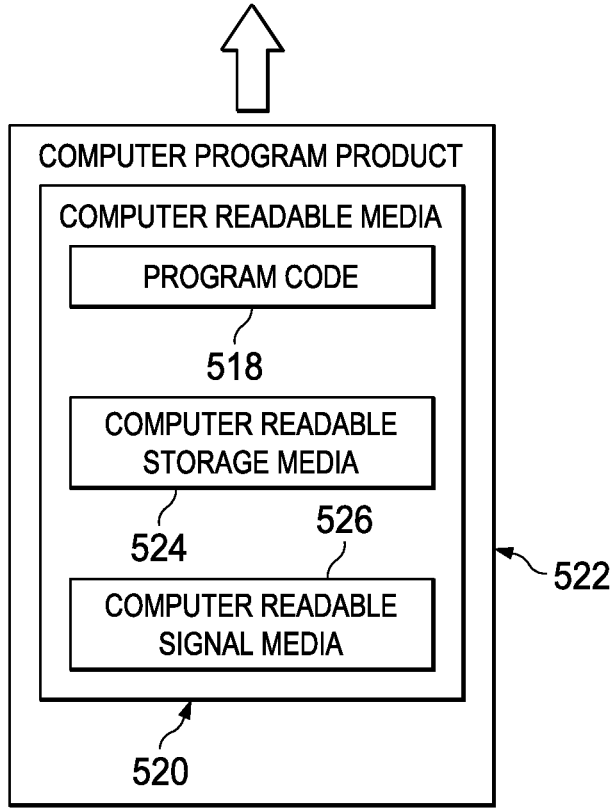

Turning now to FIG. 5, an illustration of a data processing system is depicted in accordance with an illustrative embodiment. In this example, data processing system 500 is an example of one implementation of data processing device 110 in FIG. 1. Data processing system 500 also is an example of one implementation of a data processing system on aircraft network data processing system 106 in FIG. 1. In this illustrative example, data processing system 500 includes communications fabric 502. Communications fabric 502 provides communications between processor unit 504, memory 506, persistent storage 508, communications unit 510, input/output (I/O) unit 512, and display 514. Memory 506, persistent storage 508, communications unit 510, input/output (I/O) unit 512, and display 514 are examples of resources accessible by processor unit 504 via communications fabric 502.

Processor unit 504 serves to run instructions for software that may be loaded into memory 506. Processor unit 504 may be a number of processors, a multi-processor core, or some other type of processor, depending on the particular implementation. Further, processor unit 504 may be implemented using a number of heterogeneous processor systems in which a main processor is present with secondary processors on a single chip. As another illustrative example, processor unit 504 may be a symmetric multi-processor system containing multiple processors of the same type.

Memory 506 and persistent storage 508 are examples of storage devices 516. A storage device is any piece of hardware that is capable of storing information such as, for example, without limitation, data, program code in functional form, and other suitable information either on a temporary basis or a permanent basis. Storage devices 516 may also be referred to as computer readable storage devices in these examples. Memory 506, in these examples, may be, for example, a random access memory or any other suitable volatile or non-volatile storage device. Persistent storage 508 may take various forms, depending on the particular implementation.

For example, persistent storage 508 may contain one or more components or devices. For example, persistent storage 508 may be a hard drive, a flash memory, a rewritable optical disk, a rewritable magnetic tape, or some combination of the above. The media used by persistent storage 508 also may be removable. For example, a removable hard drive may be used for persistent storage 508.

Communications unit 510, in these examples, provides for communications with other data processing systems or devices. In these examples, communications unit 510 is a network interface card. Communications unit 510 may provide communications through the use of either or both physical and wireless communications links.

Input/output unit 512 allows for input and output of data with other devices that may be connected to data processing system 500. For example, input/output unit 512 may provide a connection for user input through a keyboard, a mouse, and/or some other suitable input device. Further, input/output unit 512 may send output to a printer. Display 514 provides a mechanism to display information to a user.

Instructions for the operating system, applications, and/or programs may be located in storage devices 516, which are in communication with processor unit 504 through communications fabric 502. In these illustrative examples, the instructions are in a functional form on persistent storage 508. These instructions may be loaded into memory 506 for execution by processor unit 504. The processes of the different embodiments may be performed by processor unit 504 using computer-implemented instructions, which may be located in a memory, such as memory 506.

These instructions are referred to as program instructions, program code, computer usable program code, or computer readable program code that may be read and executed by a processor in processor unit 504. The program code in the different embodiments may be embodied on different physical or computer readable storage media, such as memory 506 or persistent storage 508.

Program code 518 is located in a functional form on computer readable media 520 that is selectively removable and may be loaded onto or transferred to data processing system 500 for execution by processor unit 504. Program code 518 and computer readable media 520 form computer program product 522 in these examples. In one example, computer readable media 520 may be computer readable storage media 524 or computer readable signal media 526.

Computer readable storage media 524 may include, for example, an optical or magnetic disk that is inserted or placed into a drive or other device that is part of persistent storage 508 for transfer onto a storage device, such as a hard drive, that is part of persistent storage 508. Computer readable storage media 524 also may take the form of a persistent storage, such as a hard drive, a thumb drive, or a flash memory, that is connected to data processing system 500. In some instances, computer readable storage media 524 may not be removable from data processing system 500.

In these examples, computer readable storage media 524 is a physical or tangible storage device used to store program code 518 rather than a medium that propagates or transmits program code 518. Computer readable storage media 524 is also referred to as a computer readable tangible storage device or a computer readable physical storage device. In other words, computer readable storage media 524 is a media that can be touched by a person.

Alternatively, program code 518 may be transferred to data processing system 500 using computer readable signal media 526. Computer readable signal media 526 may be, for example, a propagated data signal containing program code 518. For example, computer readable signal media 526 may be an electromagnetic signal, an optical signal, or any other suitable type of signal. These signals may be transmitted over communications links, such as wireless communications links, optical fiber cable, coaxial cable, a wire, or any other suitable type of communications link. In other words, the communications link or the connection may be physical or wireless in the illustrative examples.

In some illustrative embodiments, program code 518 may be downloaded over a network to persistent storage 508 from another device or data processing system through computer readable signal media 526 for use within data processing system 500. For instance, program code stored in a computer readable storage medium in a server data processing system may be downloaded over a network from the server to data processing system 500. The data processing system providing program code 518 may be a server computer, a client computer, or some other device capable of storing and transmitting program code 518.

The different components illustrated for data processing system 500 are not meant to provide architectural limitations to the manner in which different embodiments may be implemented. The different illustrative embodiments may be implemented in a data processing system including components in addition to and/or in place of those illustrated for data processing system 500. Other components shown in FIG. 5 can be varied from the illustrative examples shown. The different embodiments may be implemented using any hardware device or system capable of running program code. As one example, data processing system 500 may include organic components integrated with inorganic components and/or may be comprised entirely of organic components excluding a human being. For example, a storage device may be comprised of an organic semiconductor.

In another illustrative example, processor unit 504 may take the form of a hardware unit that has circuits that are manufactured or configured for a particular use. This type of hardware may perform operations without needing program code to be loaded into a memory from a storage device to be configured to perform the operations.

For example, when processor unit 504 takes the form of a hardware unit, processor unit 504 may be a circuit system, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, a programmable array logic, a field programmable logic array, a field programmable gate array, and other suitable hardware devices. With this type of implementation, program code 518 may be omitted, because the processes for the different embodiments are implemented in a hardware unit.

In still another illustrative example, processor unit 504 may be implemented using a combination of processors found in computers and hardware units. Processor unit 504 may have a number of hardware units and a number of processors that are configured to run program code 518. With this depicted example, some of the processes may be implemented in the number of hardware units, while other processes may be implemented in the number of processors.

In another example, a bus system may be used to implement communications fabric 502 and may be comprised of one or more buses, such as a system bus or an input/output bus. Of course, the bus system may be implemented using any suitable type of architecture that provides for a transfer of data between different components or devices attached to the bus system.

Additionally, communications unit 510 may include a number of devices that transmit data, receive data, or transmit and receive data. Communications unit 510 may be, for example, a modem or a network adapter, two network adapters, or some combination thereof. Further, a memory may be, for example, memory 506, or a cache, such as found in an interface and memory controller hub that may be present in communications fabric 502.

The description of the different illustrative embodiments has been presented for purposes of illustration and description and is not intended to be exhaustive or to limit the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for updating identity information in an aircraft network data processing system on an aircraft, comprising:
   receiving, by the aircraft network data processing system, updated identity information and a digital signature for the updated identity information from a data processing device connected to the aircraft network data processing system;
   determining, by the aircraft network data processing system, whether the digital signature is correct;
   determining, by the aircraft network data processing system, whether the updated identity information is newer than current identity information stored in persistent storage in the aircraft network data processing system; and
   responsive to determinations that the digital signature is correct and that the updated identity information is newer than the current identity information, storing the updated identity information in the persistent storage in the aircraft network data processing system.

2. The method of claim 1 further comprising:
   determining, by the aircraft network data processing system, whether the data processing device is allowed to access the aircraft network data processing system using the updated identity information.

3. The method of claim 1, wherein the updated identity information comprises an updated certificate revocation list,
   wherein the current identity information comprises a current certificate revocation list,
   wherein receiving the updated identity information and the digital signature for the updated identity information from the data processing device connected to the aircraft network data processing system comprises receiving, by the aircraft network data processing system, the updated certificate revocation list and a digital signature for the updated certificate revocation list from the data processing device connected to the aircraft network data processing system,
   wherein determining whether the updated identity information is newer than the current identity information stored in the persistent storage in the aircraft network data processing system comprises determining, by the aircraft network data processing system, whether the updated certificate revocation list is newer than the current certificate revocation list, further wherein the current certificate revocation list is stored in the persistent storage in the aircraft network data processing system, and
   wherein storing the updated identity information in the persistent storage in the aircraft network data processing system comprises, responsive to determinations that the digital signature is correct and that the updated certificate revocation list is newer than the current certificate revocation list, storing the updated certificate revocation list in the persistent storage in the aircraft network data processing system.

4. The method of claim 1, wherein the updated identity information comprises updated device configuration information for a plurality of device configurations,
   wherein the current identity information comprises current device configuration information for the plurality of device configurations,
   wherein receiving the updated identity information and the digital signature for the updated identity information from the data processing device connected to the aircraft network data processing system comprises receiving, by the aircraft network data processing system, the updated device configuration information for the plurality of device configurations and a digital signature for the updated device configuration information for the plurality of device configurations from the data processing device connected to the aircraft network data processing system,
   wherein determining whether the updated identity information is newer than the current identity information stored in the persistent storage in the aircraft network data processing system comprises determining, by the aircraft network data processing system, whether the updated device configuration information for the plurality of device configurations is newer than the current device configuration information for the plurality of device configurations, further wherein the current device configuration information for the plurality of device configurations is stored in the persistent storage in the aircraft network data processing system, and
   wherein storing the updated identity information in the persistent storage in the aircraft network data processing system comprises, responsive to determinations that the digital signature is correct and that the updated device configuration information for the plurality of device configurations is newer than the current device configuration information for the plurality of device configurations, storing the updated device configuration information for the plurality of device configurations in the persistent storage in the aircraft network data processing system.

5. The method of claim 1 further comprising:
receiving, by the aircraft network data processing system, an aircraft software part number for the updated identity information from the data processing device; and
changing an aircraft configuration for the aircraft using the aircraft software part number.

6. The method of claim 1, wherein the data processing device is a portable maintenance device.

7. An apparatus comprising:
a processor unit on an aircraft network data processing system on an aircraft configured to:
receive updated identity information and a digital signature for the updated identity information from a data processing device connected to the aircraft network data processing system;
determine whether the digital signature is correct;
determine whether the updated identity information is newer than current identity information stored in persistent storage in the aircraft network data processing system; and
store the updated identity information in the persistent storage in response to determinations that the digital signature is correct and that the updated identity information is newer than the current identity information.

8. The apparatus of claim 7, wherein the processor unit on the aircraft network data processing system on the aircraft is further configured to:
determine whether the data processing device is allowed to access the aircraft network data processing system using the updated identity information.

9. The apparatus of claim 7, wherein the updated identity information comprises an updated certificate revocation list,
wherein the current identity information comprises a current certificate revocation list,
wherein the processor unit is configured to receive the updated certificate revocation list and a digital signature for the updated certificate revocation list from the data processing device connected to the aircraft network data processing system,
wherein the processor unit is configured to determine whether the updated certificate revocation list is newer than the current certificate revocation list, further wherein the current certificate revocation list is stored in the persistent storage in the aircraft network data processing system, and
wherein the processor unit is configured to store the updated certificate revocation list in the persistent storage in response to determinations that the digital signature is correct and that the updated certificate revocation list is newer than the current certificate revocation list.

10. The apparatus of claim 7, wherein the updated identity information comprises updated device configuration information for a plurality of device configurations,
wherein the current identity information comprises current device configuration information for the plurality of device configurations,
wherein the processor unit is configured to receive the updated device configuration information for the plurality of device configurations and a digital signature for the updated device configuration information for the plurality of device configurations from the data processing device connected to the aircraft network data processing system,
wherein the processor unit is configured to determine whether the updated device configuration information for the plurality of device configurations is newer than the current device configuration information for the plurality of device configurations, further wherein the current device configuration information for the plurality of device configurations is stored in the persistent storage in the aircraft network data processing system, and
wherein the processor unit is configured to store the updated device configuration information for the plurality of device configurations in the persistent storage in response to determinations that the digital signature is correct and that the updated device configuration information for the plurality of device configurations is newer than the current device configuration information for the plurality of device configurations.

11. The apparatus of claim 7, wherein the processor unit on the aircraft network data processing system on the aircraft is further configured to:
receive an aircraft software part number for the updated identity information from the data processing device; and
change an aircraft configuration for the aircraft using the aircraft software part number.

12. The apparatus of claim 7, wherein the data processing device is a portable maintenance device.

13. A method for updating identity information in an aircraft network data processing system on an aircraft, the method comprising:
connecting on the aircraft a data processing device to the aircraft network data processing system on the aircraft;
sending on the aircraft from the data processing device to the aircraft network data processing system on the aircraft updated identity information, a digital signature for the updated identity information, and a time stamp for the updated identity information, the updated identity information comprising information identifying a plurality of items;
sending on the aircraft the identity information for the data processing device from the data processing device to the aircraft network data processing system on the aircraft; and
accessing on the aircraft the aircraft network data processing system on the aircraft by the data processing device in response to a determination by the aircraft network data processing system on the aircraft that the data processing device is allowed to access the aircraft network data processing system on the aircraft,
wherein the aircraft network data processing system on the aircraft uses the updated identity information and the identity information for the data processing device to make the determination.

14. The method of claim 13, wherein the updated identity information comprises an updated certificate revocation list,
wherein the identity information for the data processing device comprises a digital certificate for the data processing device,
wherein sending on the aircraft from the data processing device to the aircraft network data processing system on the aircraft the updated identity information, the digital signature for the updated identity information, and the time stamp for the updated identity information comprises sending on the aircraft from the data processing device to the aircraft network data processing system on the aircraft the updated certificate revocation list, a digital signature for the updated certificate revocation list, and a time stamp for the updated certificate revocation list, the updated certificate revocation list comprising the information identifying the plurality of items,
wherein sending on the aircraft the identity information for the data processing device from the data processing device to the aircraft network data processing system on the aircraft comprises sending on the aircraft the digital certificate for the data processing device from the data processing device to the aircraft network data processing system, and wherein the aircraft network data processing system on the aircraft uses the updated certificate revocation list and the digital certificate for the data processing device to make the determination.

15. The method of claim 13, wherein the updated identity information comprises updated device configuration information for a plurality of device configurations,
   wherein the identity information for the data processing device comprises configuration information identifying a configuration of software on the data processing device,
   wherein sending on the aircraft from the data processing device to the aircraft network data processing system on the aircraft the updated identity information, the digital signature for the updated identity information, and the time stamp for the updated identity information comprises sending on the aircraft from the data processing device to the aircraft network data processing system on the aircraft the updated device configuration information for the plurality of device configurations, a digital signature for the updated device configuration information for the plurality of device configurations, and a time stamp for the updated device configuration information for the plurality of device configurations, the updated device configuration information for the plurality of device configurations comprising the information identifying the plurality of items,
   wherein sending on the aircraft the identity information for the data processing device from the data processing device to the aircraft network data processing system on the aircraft comprises sending on the aircraft the configuration information identifying the configuration of the software on the data processing device from the data processing device to the aircraft network data processing system, and
   wherein the aircraft network data processing system on the aircraft uses the updated device configuration information for the plurality of device configurations and the configuration information identifying the configuration of the software on the data processing device to make the determination.

16. The method of claim 13 further comprising sending on the aircraft an aircraft software part number for the updated identity information from the data processing device to the aircraft network data processing system on the aircraft.

17. The method of claim 13 further comprising:
   connecting the data processing device to a network;
   loading the updated identity information onto the data processing device from the network; and
   disconnecting the data processing device from the network after loading the updated identity information onto the data processing device and before connecting the data processing device to the aircraft network data processing system on the aircraft.

18. The method of claim 13, wherein the data processing device is a portable maintenance device.

19. The method of claim 6, wherein the portable maintenance device is connected on the aircraft to the aircraft network data processing system with a physical connection,
   wherein the physical connection comprises one or more of an electric wire and a fiber optic connection,
   wherein the updated identity information comprises an updated certificate revocation list,
   wherein the current identity information comprises a current certificate revocation list,
   wherein receiving, by the aircraft network data processing system, the updated identity information and the digital signature for the updated identity information from the data processing device connected to the aircraft network data processing system comprises receiving, by the aircraft network data processing system, the updated certificate revocation list and a digital signature for the updated certificate revocation list from the data processing device connected to the aircraft network data processing system,
   wherein determining, by the aircraft network data processing system, whether the updated identity information is newer than the current identity information stored in the persistent storage in the aircraft network data processing system comprises determining, by the aircraft network data processing system, whether the updated certificate revocation list is newer than the current certificate revocation list, further wherein the current certificate revocation list is stored in the persistent storage in the aircraft network data processing system, and
   wherein responsive to the determinations that the digital signature is correct and that the updated identity information is newer than the current identity information, storing the updated identity information in the persistent storage in the aircraft network data processing system comprises responsive to the determinations that the digital signature is correct and that the updated certificate revocation list is newer than the current certificate revocation list, storing the updated certificate revocation list in the persistent storage in the aircraft network data processing system.

20. The method of claim 12, wherein the portable maintenance device is connected on the aircraft to the aircraft network data processing system with a physical connection,
   wherein the physical connection comprises one or more of an electric wire and a fiber optic connection,
   wherein the updated identity information comprises an updated certificate revocation list,
   wherein the current identity information comprises a current certificate revocation list,
   wherein receive the updated identity information and the digital signature for the updated identity information from the data processing device connected to the aircraft network data processing system comprises receive the updated certificate revocation list and a digital signature for the updated certificate revocation list from the data processing device connected to the aircraft network data processing system,
   wherein determine whether the updated identity information is newer than the current identity information stored in the persistent storage in the aircraft network data processing system comprises determine whether the updated certificate revocation list is newer than the current certificate revocation list, further wherein the current certificate revocation list is stored in the persistent storage in the aircraft network data processing system, and
   wherein store the updated identity information in the persistent storage in response to the determinations that the digital signature is correct and that the updated identity information is newer than the current identity information comprises store the updated certificate revocation list in the persistent storage in response to the determinations that the digital signature is correct and that the updated certificate revocation list is newer than the current certificate revocation list.

\* \* \* \* \*